(12) United States Patent
Leonelli et al.

(10) Patent No.: US 10,732,969 B2
(45) Date of Patent: Aug. 4, 2020

(54) METHOD AND APPARATUS FOR CREATING AND MANAGING CONTROLLER BASED REMOTE SOLUTIONS

(71) Applicant: Ciambella Ltd., Tortola (VG)

(72) Inventors: Jean-Baptiste Leonelli, Levallois (FR); Trisala Chandaria, New York, NY (US)

(73) Assignee: Ciambella Ltd., Tortola (VG)

( * ) Notice: Subject to any disclaimer, the term of this patent is extended or adjusted under 35 U.S.C. 154(b) by 602 days.

(21) Appl. No.: 15/386,180

(22) Filed: Dec. 21, 2016

(65) Prior Publication Data

US 2017/0180462 A1 Jun. 22, 2017

Related U.S. Application Data (60) Provisional application No. 62/270,107, filed on Dec. 21, 2015, provisional application No. 62/377,963, filed on Aug. 22, 2016.

(51) Int. Cl.
*G06F 9/00* (2006.01)
*G06F 8/30* (2018.01)
(Continued)

(52) U.S. Cl.
CPC ............ *G06F 9/00* (2013.01); *G06F 8/30* (2013.01); *G06F 8/35* (2013.01); *G06F 8/65* (2013.01); *G06F 9/547* (2013.01)

(58) Field of Classification Search
CPC ...................................................... G06F 9/00
See application file for complete search history.

(56) References Cited

U.S. PATENT DOCUMENTS 6,065,053 A   5/2000  Nouri et al.
6,108,715 A   8/2000  Leach et al.
(Continued)

FOREIGN PATENT DOCUMENTS

CN      1821964 A    8/2006
CN    201017215 Y    2/2008
(Continued)

OTHER PUBLICATIONS

International Search Report and Written Opinion dated Nov. 15, 2017 for PCT Application No. PCT/US2017/047944.
(Continued)

*Primary Examiner* — Suraj M Joshi
(74) *Attorney, Agent, or Firm* — Moser Taboada (57) ABSTRACT

A method and apparatus for creating and managing a controller based remote solution is provided. The method comprises receiving, at a code virtualization server (CVS) from a graphical user interface (GUI), an input of a solution comprising a controller communicably coupled with and operable to control a sensor and/or an actuator, a condition at the at the sensor and/or the actuator, an action for execution by the controller upon the condition being met, and at least one parameter for the solution. A program (AGCP) for the controller is automatically generated on the CVS based on the input solution. The program comprises code to check if the condition is met, and to execute the action when the condition is met. The AGCP is downloaded to a storage on the user device, or sent to the at least one controller, for installation on the at least one controller.

19 Claims, 6 Drawing Sheets

(51) Int. Cl.
*G06F 8/35* (2018.01)
*G06F 9/54* (2006.01)
*G06F 8/65* (2018.01)

(56) References Cited

U.S. PATENT DOCUMENTS

| | | | |
|---|---|---|---|
| 6,158,031 | A | 12/2000 | Mack et al. |
| 6,895,573 | B2 | 5/2005 | Norgaard et al. |
| 7,086,014 | B1 | 8/2006 | Bartz et al. |
| 7,246,319 | B2 | 7/2007 | Alden et al. |
| 8,055,386 | B2 | 11/2011 | McCoy et al. |
| 8,086,744 | B2 | 12/2011 | Abdullah et al. |
| 8,352,903 | B1 | 1/2013 | Friedman |
| 8,990,787 | B2 | 3/2015 | Balassanian |
| 2002/0194313 | A1 | 12/2002 | Brannock |
| 2003/0061274 | A1 | 3/2003 | Lo |
| 2003/0120707 | A1 | 6/2003 | Bogdan et al. |
| 2003/0177208 | A1 | 9/2003 | Harvey, IV |
| 2003/0204560 | A1 | 10/2003 | Chen et al. |
| 2004/0010734 | A1 | 1/2004 | Ghercioiu et al. |
| 2004/0193635 | A1 | 9/2004 | Hsu et al. |
| 2004/0221238 | A1 | 11/2004 | Cifra et al. |
| 2004/0249944 | A1 | 12/2004 | Hosking et al. |
| 2005/0114644 | A1 | 5/2005 | Chu et al. |
| 2005/0114854 | A1 | 5/2005 | Padisetty et al. |
| 2005/0177269 | A1 | 8/2005 | Funk |
| 2005/0256964 | A1 | 11/2005 | Dube |
| 2005/0283786 | A1 | 12/2005 | Dettinger et al. |
| 2006/0122730 | A1 | 6/2006 | Niemela et al. |
| 2006/0271537 | A1 | 11/2006 | Chandrasekharan et al. |
| 2007/0174037 | A1 | 7/2007 | Ling |
| 2007/0186246 | A1 | 8/2007 | Goldhor |
| 2008/0092073 | A1 | 4/2008 | Shih et al. |
| 2009/0095807 | A1 | 4/2009 | Dickerson et al. |
| 2009/0198770 | A1 | 8/2009 | Jiang |
| 2009/0307105 | A1 | 12/2009 | Lemay et al. |
| 2010/0010908 | A1 | 1/2010 | Pasupulati et al. |
| 2010/0271989 | A1 | 10/2010 | Chernoguzov et al. |
| 2010/0299187 | A1 | 11/2010 | Duggal |
| 2011/0238969 | A1 | 9/2011 | Warkentin et al. |
| 2011/0246891 | A1 | 10/2011 | Schubert et al. |
| 2011/0295391 | A1* | 12/2011 | Schneider .......... G05B 19/0426 700/87 |
| 2012/0036493 | A1 | 2/2012 | Moosmann et al. |
| 2012/0311526 | A1 | 12/2012 | DeAnna et al. |
| 2013/0201316 | A1 | 8/2013 | Binder et al. |
| 2013/0275560 | A1 | 10/2013 | Bestmann et al. |
| 2014/0101581 | A1 | 4/2014 | Lan et al. |
| 2014/0372963 | A1 | 12/2014 | Chandaria et al. |
| 2014/0372975 | A1 | 12/2014 | Chandaria et al. |
| 2015/0045960 | A1* | 2/2015 | Caron .................... G05B 15/02 700/276 |
| 2015/0127192 | A1 | 5/2015 | Phatak et al. |
| 2015/0199088 | A1 | 7/2015 | Chandaria et al. |
| 2015/0286362 | A1 | 10/2015 | Chandaria et al. |
| 2015/0331406 | A1 | 11/2015 | Wang |
| 2016/0092064 | A1 | 3/2016 | Wu |
| 2016/0327925 | A1 | 11/2016 | Leonelli et al. |
| 2016/0357526 | A1 | 12/2016 | Soffer et al. |

FOREIGN PATENT DOCUMENTS

| | | |
|---|---|---|
| CN | 101373441 A | 2/2009 |
| CN | 101438299 A | 5/2009 |
| CN | 102177501 A | 9/2011 |
| CN | 102262557 A | 11/2011 |
| CN | 102271153 A | 12/2011 |
| CN | 102479079 A | 5/2012 |
| CN | 102999322 A | 3/2013 |
| EP | 3092561 A1 | 11/2016 |
| JP | 2006216048 A | 8/2006 |
| JP | 2008021095 A | 1/2008 |
| JP | 2010539600 A | 12/2010 |
| JP | 2011150430 A | 8/2011 |
| JP | 2016112651 A | 6/2016 |
| KR | 20080044576 A | 5/2008 |
| WO | WO-2005050503 A1 | 6/2005 |
| WO | WO-2013058768 A1 | 4/2013 |
| WO | WO-2014041623 A1 | 3/2014 |
| WO | WO-2014204989 A1 | 12/2014 |
| WO | WO-2017/027632 A1 | 2/2017 |

OTHER PUBLICATIONS

Haruyoshi Maruyama, "How to Use Device Driver Configurator," Interface, CQ Publishing Co., Ltd., vol. 33, No. 6, Jun. 1, 2007, pp. 57-70.
International Search Report and written Opinion dated Apr. 13, 2017 for PCT Application No. PCT/US2016/067944, 14 pgs.
Feipeng Liu, "Android Native development Kit Cookbook", Mar. 1, 2013, XP055326992, ISBN: 978-1-84969-150-5, retrieved on Dec. 7, 2016 from: http://file.allitebooks.com/20150520/Android%20Native%20Development%20Kit%20Cookbook.pdf, pp. 1-331.
International Search Report and Written Opinion dated Nov. 24, 2017 for PCT Application No. PCT/US2017/047964.
International Search Report and written Opinion dated Oct. 4, 2016 for PCT Application No. PCT/US2016/041573.
Singapore Written Opinion dated Jun. 11, 2018 for Application No. 11201708743U.
International Search Report and Written Opinion dated Jun. 15, 2018 for PCT Application No. PCT/US2018/022359.
Japanese Office Action dated Jun. 18, 2018 for Application No. 2016-521515.
Japanese Office Action dated Jun. 18, 2018 for Application No. 2016-521516.
Japanese Office Action dated Jun. 18, 2018 for Application No. 2016-521518.
Chinese Office Action dated Jun. 21, 2018 for Application No. 201480038517.8.
Extended European Search Report dated Oct. 23, 2017 for Application No. 15735508.2.
International Search Report and Written Opinion dated Apr. 22, 2019 for PCT Application No. PCT/US18/63704.
Kreger, Heather, "Web Services Conceptual Architecture (WSCA 1.0)," Internet Citation, May 2001.
PCT International Search Report and Written Opinion on application No. PCT/US2019/055109 dated Jan. 22, 2020.
Cano Julio et al: "Coordination of ECA Rules by Verification and Control", Jun. 3, 2014, International Conference on Computer Analysis of Images and Patterns, CAIP 2017. [Lecture Notes in Computer Science], Springer, Berlin, Heidelberg, pp. 33-48.
Partial Supplementary European Search Report for application No. EP 16880005, date Oct. 21, 2019.

\* cited by examiner

METHOD AND APPARATUS FOR CREATING AND MANAGING CONTROLLER BASED REMOTE SOLUTIONS

CROSS-REFERENCE TO RELATED APPLICATIONS

This application claims priority to U.S. Provisional Patent Application No. 62/270,107 filed on Dec. 21, 2015; and 62/377,963 filed on Aug. 22, 2016, each of which is incorporated by reference herein in its entirety.

BACKGROUND OF THE INVENTION

Field of the Invention

Embodiments of the present invention generally relate to a method and apparatus for creating and managing controller based remote solutions.

Description of the Related Art

The use of field programmable gate arrays (FPGAs) and other controller-based devices (e.g. microcontroller or microprocessor based), such as MCU, SoC, mobile phones, computers, etc. have grown considerably popular. Low manufacturing costs, availability, and customization of controllers have led to a proliferation of microcontrollers and Systems on a Chip (SoC) (e.g., PIC, ARDUINO, RASPBERRY PI and the like) being used by commercial companies and hobbyists alike for creation of devices. Controller-based devices include a processor core and a memory, which are programmable for processing input/output data in communication with electronic devices or peripheral devices. Program memory in the form of NOR FLASH or OTP ROM is also often included on such controller-based devices, as well as a small amount of random access memory (RAM). Several such controller-based devices are designed for embedded applications within larger devices. Real world applications of such controller-based devices can potentially include connecting controller-based devices with real-world objects or systems as peripherals, thereby enabling digitization, connectivity and even remote control of such peripherals. However, several challenges exist in making such real world applications due to the complexity of combining Cloud technologies with hardware and software technologies.

In general, programming controller-based devices or groups thereof is quite complex. Furthermore, when such controller-based devices (or 'controller devices' or 'controllers') are used for real-world controlling conventional systems, for example, various actuators and sensors, programming such controllers is even more complex. As the "Internet of Things (IoT)" grows, more and more such controller-based devices are connected to one another and/or to the Internet, significantly increasing the complexity of programming. In real-world scenarios, such controller-based devices may communicate with one another and/or to a gateway such that the gateway becomes a proxy for the Internet communications for the so-called edge devices. Edge devices may communicate through one or more gateways, or directly as independent devices. Within a group, all the devices (gateway and edge) must be programmed in a compatible manner to facilitate interoperability, which further increases the complexity of programming such devices significantly. Further, managing compatibility every time a customization is implemented may also be excessively time consuming. Programming groups of controller-based devices is very challenging for users as one has to memorize coding commands, understand hierarchies, utilize proper calling syntaxes, and the like. Even if one device is programmed incorrectly, a written program for that or another controller-based device in the group may fail to run, or produce errors.

Thus, there is a need in the art for simplifying programming for controller-based devices, while automatically doing so for a group of controller-based devices.

SUMMARY OF THE INVENTION

Embodiments of the present invention generally relate to a method and apparatus for creating and managing controller based remote solutions, substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to method and apparatus for creating and managing controller based remote solutions, and more specifically to create, deploy, and manage remote solutions incorporating controller devices (e.g., devices having a controller, such as microcontrollers, microprocessors, SoC, MCU, among others) deployed in an application system (e.g. a water tank, a refrigerator and the like). The controller devices are operable to monitor and control the application system using sensors and actuators. Embodiments of the present invention, using a graphical user interface (GUI) available to the user, enable the user to build a solution comprising several applications distributed over one or more controllers or groups of controllers, and automatically generate programs for the controllers to operationalize the solution. Applications of the solution include one or more actions executed by the controllers, upon specified condition(s) relating to the application system, for example, at the sensors or actuators, being met.

The solution is built by selecting a pre-defined solution template on a GUI. Alternatively, the solution may also be built in the GUI starting from a blank template, by identifying or defining details of one or more of the controllers, application system, actuators and sensors to monitor and control the application systems, actions, conditions for triggering the actions by the controllers, the connectivity between the controllers, actuators, sensors and the application system, or parameters for the solution. Parameters for the solution may include one or more of parameters related to operation of controllers, application systems, conditions, actions, actuators, sensors, connectivity (connection profiles, connection parameters, protocols) and other operational information required for execution of the programs for the controllers. Based on the designed solution, program(s) for controllers deployed in the application systems are automatically generated by a code generator (which may work with, or include an SDK generator) on a code virtualization server (CVS), and are referred to as automatically generated controller programs (AGCP).

For example, using the GUI, the user selects a pre-defined solution or builds a solution, such as a controller-based solution for a water tank, a refrigerator, or boiler systems, and the like. The user identifies on the GUI, relevant controller device(s) (including a controller and other hardware, such as sensors, actuators, among others, for operationalizing the pre-defined solution), and further provides parameters for operating the controller device(s), the application system, and the AGCP. These inputs, received at the GUI on the user device, are sent to the CVS for creating the AGCP for the controller device(s), in a language suitable for the controller device(s), and according to the processing power of the controller device(s). The AGCP includes pre-defined program code, aggregated based on the user input received via the GUI. Parameters for executing the AGCP may also be input by the user on the GUI, and received at the CVS. The AGCP is then deployed on the controller devices, thereby implementing the designed solution. In some embodiments, along with the AGCP, software components to assist in executing the AGCP, for example, an SDK is also generated, and such components are included in the AGCP, deployed separately on the controller devices, or deployed on a device remote but accessible to the controller devices (that is, the components may be virtualized).

The solution may include additional functionalities, such as sending status update to the GUI in real time, at pre-defined time intervals, upon an occurrence of an event, or other defined conditions, enabling remote monitoring of the deployed solution. Further, using the GUI, a user may make modifications to any portion of the designed solution, and cause modification or regeneration of the AGCP, and redeploy such modified or regenerated AGCP to the controllers, thereby modifying the designed or the implemented solution. Such modifications can be implemented live, that is, the modification or regeneration of the AGCP is performed as soon as the modifications are specified. In some cases, the required modifications do not change conditions that relate to the controller hardware, and such modifications do not need modification or regeneration of the AGCP.

Further, the AGCP may also include a remote call to a virtual program to be executed on a device remote to the controllers, in effect, virtualizing part of the AGCP, because a part of the designed functionality of the AGCP is executed virtually, and not on the controller which executes the AGCP. Functionality of the AGCP is abstracted or virtualized to virtual programs because such functionality may be too resource intensive for the controller to execute. In some cases, even if the controller could 'handle' executing such functionality, it may be otherwise desirable to abstract such functionality off the controller, for example, for better reliability, provisioning of such functionality for multiple controllers instead of one, among several other reasons as would occur to those skilled in the art. The remote device may be the same as or different from the device which automatically generates the AGCP. For simplicity of explanation, the device is referred to as the code virtualization server (CVS) and the virtual program may be referred to as CVS program (CVSP), which is stored on the CVS, and executed upon receiving, at the CVS, the remote call from the controller executing the AGCP. The AGCP may also include code to provision a remote service directly, or via the CVSP. When provisioning the remote service via the CVSP, the execution of the CVSP on the CVS causes provisioning of a remote service. The remote service is a service provided by a device other than the CVS or the controllers.

Deployment of several controllers in the application systems pose a significant challenge in terms of programming such controllers to implement a desired solution, and further, in monitoring, modifying and otherwise managing such a solution. Specifically, different components of application systems would require different peripheral or electronic devices to control the application systems, such as different actuators and sensors. Therefore, controllers to control such actuators and sensors would need to be programmed according to such variations, further increasing the complexity of generating solutions for such application systems. Such a programming and maintenance challenge would be especially overwhelming for a layperson. Embodiments described herein provide a GUI interface to a user, and make it relatively simple to generate, monitor, modify, and otherwise manage controller based remote solutions deployed in application systems in a simple and effective manner.

Commonly assigned U.S. Pat. No. 8,726,285, filed 28 Jan. 2011; U.S. Pat. No. 9,235,383, filed 17 Jun. 2014; U.S. Pat. No. 9,239,705, filed 17 Jun. 2014; U.S. Pat. No. 9,436,439, filed 17 Jun. 2014; and U.S. Patent Application Publication Numbers 2009/0070121, filed 11 Sep. 2007; 2009/0070162, filed 11 Sep. 2007; 2015/0199088, filed 9 Jan. 2015; 2015/0286362, filed 13 Apr. 2015; 2016/0327925, filed 8 March 2016; and 2016/0328216, filed 6 May 2016, each of which is incorporated herein by reference in their entireties, describe techniques for developing software for a controller device incorporating a controller, mapping the use of hardware such as sensors or actuators to the controller remotely using a graphical user interface, and executing the software, e.g. remotely, to extend the capabilities of such a controller device via defined workflows.

These techniques function by placing a snippet of code and/or a library in the memory of the controller device, wherein the snippet, when executed, sends a call for a certain process or processes to be executed on a code virtualization server, and/or sends (directly or via the code virtualization server) data to a remote service provider, and/or further calls a function to be remotely performed on the data by the remote service provider. Embodiments of the present invention use these techniques to create and manage (i.e. monitor and control) controller based remote solutions comprising at least one controller device coupled to a conventional remote system. With such embodiments, remote solutions can be created for dynamic environments, for example, conventional application systems coupled to controllers. Various embodiments enable changing the code, the inputs for the code, changing the outputs required, configuring additional electronic devices (e.g. sensors, actuators, and the like) for use with the controllers, or changing the configuration of the solutions, among others, by a user using a user computer remote to the code virtualization server (or a "coding server" on which the code is created and may be executed in part), the controller devices, and the application systems.

As used herein, the term "application system" includes real world systems or applications, which are controllable by an output of a controller device using an actuator, and may be monitored via input to the controller device using a sensor. Such applications systems include systems known conventionally, such as a water storage tank, boilers, refrigeration systems, and may also sometimes be referred to as "conventional systems," which is used interchangeably with the term "application systems." Such "application systems" include systems that may be designed in the future, and can utilize the controller devices to monitor and control such systems via sensors or actuators, built in to the application system or installed in the application system, according to the techniques described herein.

In the described following embodiments, a "process" or a "program" or AGCP shall refer to a ready-to-run code base or predefined program code that is already deployed on an execution controller device or a computer (e.g., server, personal computer, mobile device, etc. for testing), unless otherwise apparent from the context. Each process is uniquely identified to the user by name, process ID, icon, or other identifier. "Execution" shall refer to the launch of a process on a controller device or a computer (local or remote or Cloud based). A "bundle" shall refer to a collection of processes organized by a common attribute (API name, common parameters, SDK, parameter names, remote server, and the like). Examples discussed herein are not limiting in scope, but rather distinguishing specific embodiments for explanatory purposes.

As an example of the techniques described herein, the application system is a water tank system in a residential rainwater harvesting application contains a pump for controlling the supply to and from the water supply grid (e.g., a water utility). It may be desirable, for example, that if the water level in the tank is sufficient (i.e., above a pre-defined threshold value), additional water from the grid is not used; however, if the water level is below the threshold level, additional water from the grid is used to fill the tank to the threshold level. Such operations are effected via sensors and actuators working in conjunction with the water tank, the grid, and the pump(s) installed therein. In order to create a remote, controller-based management solution, a user needs to design appropriate hardware configurations for the controllers, water level sensors, pump and the actuators for the pump, configure the hardware with the correct connections, generate programs for each controller, and supply the correct parameters for execution of such programs. Embodiments of the present invention provide a GUI-based system that enables a user to create and/or modify the solution.

More specifically, embodiments of the invention provide a GUI on a user device accessible to the user, and presents several solution templates stored at the code virtualization server, through the GUI, for example, to a user for selecting a particular solution, and in this example, the user selects a water tank. In some embodiments, a solution closest to a water tank is selected if a water tank solution is not available, or a solution is suggested to the user based on responses provided by the user in the GUI, to certain queries (e.g. stored at the code virtualization server) posed to the user in the GUI. In some embodiments, the user defines all components of the solution individually, and in effect builds the solution from a blank template.

According to some embodiments, upon selecting a water tank solution, which can actuate a pump or the grid water supply based on the water level in the tank, the user is presented with a desired configuration of the water tank solution. For example, the water tank solution comprises, apart from the water tank and the pump, a water level sensor to indicate the level of water in the water tank, an actuator to control the pump, the actuator functionalities including start, stop, and speed variations. The water tank solution further includes communication devices for establishing wireless or wired connections between the water level sensor, the pump, the actuator for the pump, the network, and optionally, a gateway device. If installed, the gateway device interfaces with the network on one side, and the water level sensor and the pump actuator on the other. In some embodiments, the GUI allows a user to specify connection(s) between the devices of the application system (pump, sensor) and the controller graphically, for example, specifying the output of the sensor to map to the desired pin on the controller, and specify the type of reading (e.g., input type, such as temperature or light intensity, units, data format, and the like) that will be received by the controller from the sensor. Similarly, pins of the controller, and the output type of the pin may be mapped to control the actuator for the pump, or control the pump directly, if the pump comprises digital controls (which function as an actuator). In this manner, the user defines the remote water tank solution, which is visible to the user in the GUI. According to some embodiments, upon selecting a pre-defined solution template, all such configurations are automatically defined and presented in the GUI. According to some embodiments, the GUI may present an interactive set of questions to the user to determine the solution required, and identify the required devices, such as controllers, sensors, actuators, connections therebetween, conditions and actions, among other requirements of the solution. The user may answer the questions and design a solution, and may further use the designed solution to assemble the required hardware and complete the required configuration for the solution. According to some embodiments, the user device communicates with the CVS, which comprises pre-defined solution templates, individual components of a solution, questions to aid in designing a solution, or other resources helpful in designing the solutions, in one or more reference libraries. The reference libraries on the CVS are accessible to the user device, which displays the pre-defined solution templates, the individual components of the solution, the questions or the other resources on the GUI to the user.

Once the user confirms the desired solution via the GUI, the designed solution is sent to the CVS as an input. In response to the input of the solution designed on the GUI, the CVS automatically generates a program (AGCP) for all the controller devices designed in the water tank solution, for example, in the manner as discussed above, and detailed below with reference to the drawings. Using the GUI, communicably coupled to the CVS, the user may download the AGCP locally to test the code in an environment of virtual controllers. In some embodiments, the user may instruct, via the GUI, to deploy the AGCP directly from the CVS to the respective controllers, and may further test the deployed AGCP. The deployed AGCP on the controller devices may be monitored by the user via the GUI, which is updated by the CVS with status information on the execution of AGCP, the controller, connected hardware (actuators, sensors, etc.), connections, actions, conditions, and any other parameter of the designed solution. If needed, the user may modify the solution using the GUI, in a manner similar to the creation of the solution. Upon receiving the modified solution as input from the GUI, the CVS may modify or regenerate the AGCP if needed, or the CVS may only update the parameters used by the AGCP that are already deployed, if the AGCP does not need to be modified or updated. If the AGCP is modified or regenerated, it is deployed to the respective controller. If needed, the user manages the devices and the associated code using the GUI, for example, to add controllers, changing operating conditions or parameters, defining new actions, additional conditions for triggering such actions, among others, to the designed remote solution configuration.

In some embodiments, the AGCP makes remote calls to the CVS, for executing code which is unsuitable for execution on the controller devices, due to the lack of resources required for executing such code on the controller devices. In some embodiments, such calls from the controller device are made for interacting with one or more remote services, such as FACEBOOK, TWITTER, AMAZON, data storage service, and the like, that are not provided by the controller or the CVS. These remote calls can be implemented as a call directly from the controller device to the remote services, or as a call to a program on the CVS (CVSP), which in turn interacts with the remote services and provides the data to the controller device for further execution of the AGCP code.

Embodiments of the invention are thus capable of designing, deploying, monitoring, modifying or reprogramming, or otherwise remote solutions, which include one or more controller devices installed in application systems, using a GUI on a user device, and a code virtualization server, remote to the user device.

Figure 1:
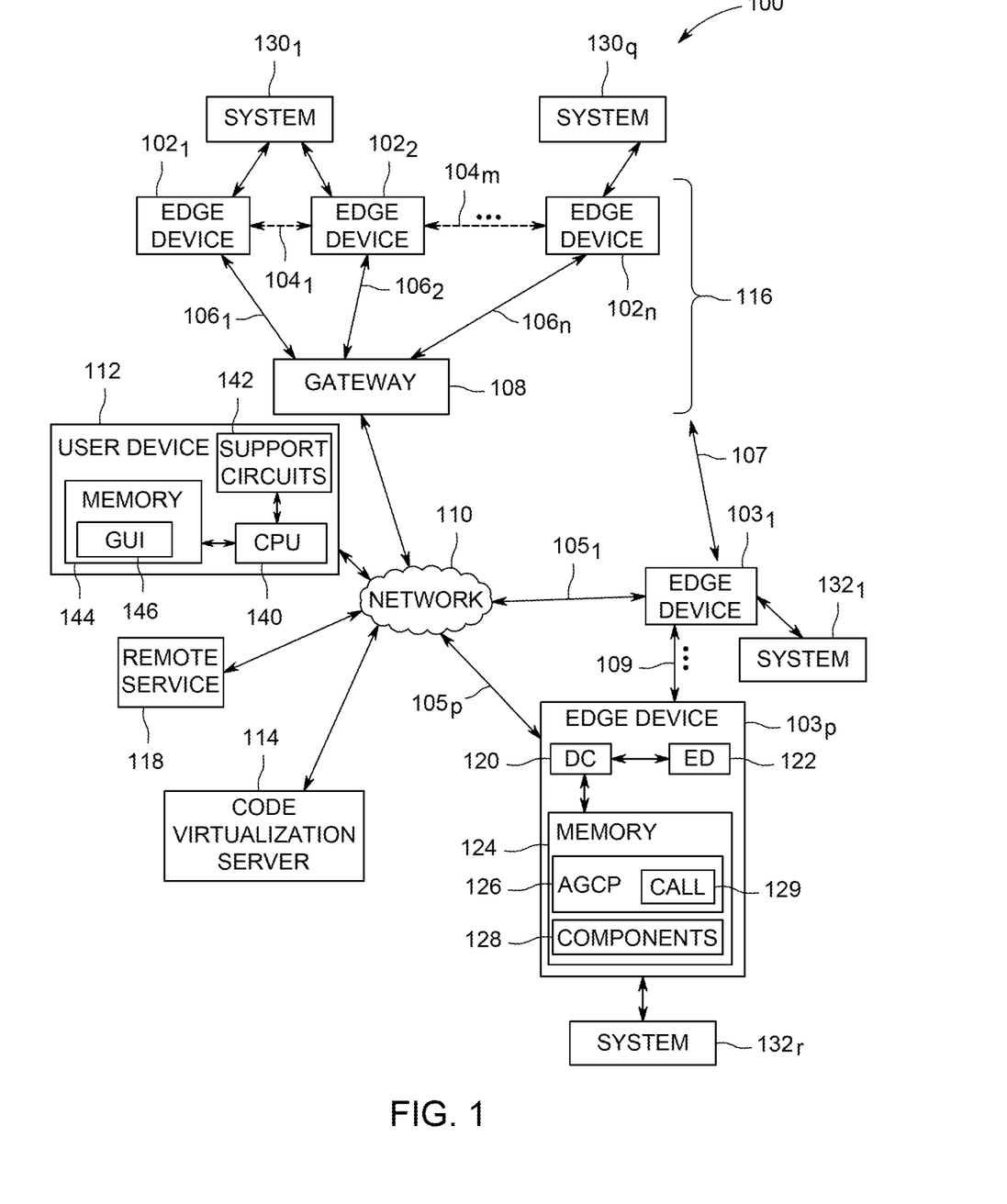
FIG. 1 is block diagram of an apparatus for creating and managing a controller based remote solution, in accordance with an embodiment of the invention.

FIG. 1 is an overview diagram of an apparatus 100 for creating and managing controller based remote solutions, for example, for conventional systems 130 ($130_1$, ... $130_q$) or systems 132 ($132_1$, ... $132_r$), in accordance with one or more embodiments of the present invention. The system 100 comprises multiple controller devices or edge devices $102_1$, $102_2$, ... $102_n$ (collectively referred to as edge devices 102) connected to the conventional systems 130 (in one-to-one, one-to-many, or many-to-one configuration), multiple controller devices or edge devices $103_1$, ... $103_p$ (collectively referred to as edge devices 103) connected to the conventional systems 132 (in one-to-one, one-to-many, or many-to-one configuration), a gateway 108 which is also a controller device, a network 110, a user device 112 or a user computer 112, a code virtualization server (CVS) 114 or a coding server 114, and a remote service 118. In the following discussion, the edge devices 102, 103 and the gateway 108 are collectively referred to as "controller devices" or "controllers". The controllers include programmable sub-systems such as ARDUINO, TEXAS INSTRUMENTS LAUNCHPAD, FREESCALE BOARDS KINETIS, ST MICROELECTRONICS STM32, INTEL EDISON, and the like. The controllers may also be a System on a Chip (SoC) such as a RASPBERRY PI and the like. Some embodiments of controllers include programmed controllers of other assembled devices and systems such as NEST THERMOSTAT, PHILIPPS HUE, BELKIN, WITHINGS, and the like.

The edge devices 102 and the gateway 108 form a group of devices (or device group 116) connected to the network 110. In the device group 116, the gateway 108 communicates internally with edge devices 102 along communications paths $106_1$, $106_2$, ... $106_n$, and externally with the network 110. Although the communications paths are generally wireless paths, in some embodiments, the paths may be wired. Also, in some embodiments, the edge devices 102 communicate amongst themselves along dashed paths $104_1$, $104_2$, ... $104_n$, or along direct paths (not shown) to all or some other edge devices 102, for example, forming a mesh network. The edge devices 103 communicate directly with the network 110, and amongst themselves along dashed path 109, and in some embodiments, each edge device 103 can communicate with another edge device 103, for example, forming a mesh network. Although a single gateway 108 is depicted, multiple gateways may be used within the group 116, or spanning multiple groups similar to the device group 116. Each edge device 102, each edge device 103, and the gateway 108 is a controller device (or incorporates one), that can be programmed either remotely or through direct connection from the user computer 112. In some embodiments, controller of each of the edge devices 102, the edge devices 103 and the gateway 108 can be programmed by the code virtualization server 114.

Each device (edge devices 102, 103, and the gateway 108) includes a device controller (DC), and a memory, and may include electronic devices (ED). Further, for example, and for the sake of brevity, only the edge device $103_p$ is shown to include the device controller 120, electronic devices 122 and a memory 124, although each device (edge devices 102, 103 and the gateway 108) includes a device controller and a memory, and may include electronic devices (ED). Some gateways (not shown), which are not coupled with or control an application system, may not include electronic devices (ED). The device controller 120 may be a microcontroller (e.g., PIC, AVR type, ARM type, and the like) or a SoC (e.g., RASPBERRY PI), or a microprocessor as generally known in the art. The type of controller may differ from device to device, for example, based on the application of such device and the functionality required. The electronic devices 122 include, but are not limited to, sensors, lights, audio speakers, actuators, displays, printers, scanners, I/O devices and the like. The electronic devices 122 comprise components to control or manage an application system, such as the systems 131, 132. The memory 124 may be any form of digital storage used for storing data and executable software. Such memory includes, but is not limited to, random access memory, read only memory, disk storage, optical storage, and the like. In some embodiments, the memory 124 stores computer readable instructions corresponding to an operating system (not shown). The memory 124 further stores an automatically generated controller program (AGCP) 126 or a program incorporating an automatically generated code snippet, a call 129, for example, a call to a function to be executed on a remote server such as the code virtualization server 114, and other code components 128, including program libraries, software development kit (SDK), necessary for executing the code including the AGCP 126 and the call 129, included in the AGCP 126. According to some embodiments, the AGCP 126 is received from the code virtualization server 114 and installed in the memory 124. The components 128 are also capable of ensuring that an edge device can communicate to the code virtualization server 114 via a gateway 108 and that the gateway 108 is capable of allowing such communications.

The user device 112 comprises a CPU 140, support circuits 142 and a memory 144. The CPU 140 may be any commercially available processor, microprocessor, microcontroller, and the like. The support circuits 142 comprise well-known circuits that provide functionality to the CPU such as a user interface, clock circuits, network communications, cache, power supplies, I/O circuits, and the like. In some embodiments, the user interface comprises a keypad, electronic buttons, speaker, touchscreen, display, or other user interaction mechanism. The memory 144 may be any form of digital storage used for storing data and executable software. Such memory includes, but is not limited to, random access memory, read only memory, disk storage, optical storage, and the like. The memory 144 stores computer readable instructions corresponding to an operating system (not shown), a graphical user interface (GUI) 146, and may store the AGCP 126 downloaded from the CVS 114, for testing or for deploying to the controller $103_p$. The user device 112 is coupled to the network 110 when designing, deploying, modifying or managing a remote controller device based solution for the conventional system or application system 130 and/or 132. In one embodiment, the user device 112 is also communicably coupled to the code virtualization server 114 via the network 110 during automatic generation of the AGCP.

The GUI 146 facilitates selection or design of a desired solution for a given application system (131, 132), sending solution details to the CVS 114 for creating or modifying AGCPs for the edge devices and/or the gateway automatically, testing and deploying the AGCPs to the edge devices 102, 103 and/or the gateways 108. According to some embodiments, the GUI 146 can retrieve, from the CVS 114, a list of pre-defined solution templates, individual components for designing solutions, questions or notes to assist in designing solutions, or other details relating to the solutions. Using the GUI, the user designs, creates, tests, and operationalizes the controller based remote solution, monitors the operationalized solution, modifies and manages the remote solution thus created.

The designed solution comprises one more controller devices communicably coupled with and operable to monitor and control the application system. The controller devices monitor the application system using one or more sensors (e.g. using a water level sensor in a water tank system), or directly receive system information from one or more elements of the application system acting as a sensor (e.g. from a boiler system comprising a digital thermostat configured to communicate the boiler temperature). Similarly, the controller devices control the application system using one or more actuators (e.g. an actuator coupled to a pump), or directly controls one or more elements of the application system acting as an actuator (a digital controller embedded in a pump). The designed solution also comprises specification of whether the controller devices are in a gateway mode or an edge mode, connectivity details between various controller devices deployed to monitor and control the application system, connectivity details between the controllers and the sensors, actuators or the elements of the application system. The designed solution may also comprise specifications of the actuators, sensors, or the elements of the application system. The designed solution also comprises specifications of the conditions of the application system, and the actions to be performed when the conditions are met. The designed solution also comprises definitions of conditions of the application system (for example, as achieved by the sensors or actuators coupled to the application system), and actions to be taken by the controller devices when such conditions are met. The designed solution may also include parameters for executing the controller programs (AGCPs), parameters for functions to be executed on the CVS based on remote calls placed by the controller devices, or parameters for provisioning remote services. The designed solution may also parameters for other components of the solution, for example, parameters for one or more of controllers, application systems, conditions, actions, actuators, sensors, connectivity (connection profiles, connection parameters, protocols). All components of a solution are selected as templates, or are defined individually using the GUI. A designed solution or components thereof also may be modified using the GUI, in a manner similar to building or designing the solution on the GUI.

According to some embodiments, the AGCP may be tested using emulated controller devices using the GUI, before the AGCP is sent for deployment to the controller devices. According to some embodiments, the AGCP may be tested using the GUI after deploying the AGCP to the controller devices. According to some embodiments, the GUI 146 can also retrieve a list of functions that may be executed on the CVS 114 upon placing a remote call from the controllers. In some embodiments, the GUI 146 includes an integrated development environment (IDE) for creating programs for the controller devices. In some embodiments, the GUI 146 is a software resident on the CVS 114, and rendered on the user device 112 via a browser.

The code virtualization server 114 stores various reference libraries, application program interfaces (APIs), software development kits (SDKs), code and SDK generating software. The CVS 114 generates, based on an input of a solution designed on and received from the GUI 146, the automatically generated controller programs (AGCPs) 126 for deploying on each of the controllers of the edge device 102, 103 and the gateway 108. The AGCP includes code corresponding to triggering an action for execution by the controller, when a condition relating to the application system is met. For example, the sensor or the actuator coupled to the application system may reach a state defined as the condition in the solution, upon which the action would be triggered for execution by the controller. The action may include changing the state of the actuator, or placing one or more remote process calls to processes or functions for execution on the code virtualization server 114, or for interacting with a remote service 118. In some embodiments, the code virtualization server 114 stores parameters related to the solution. The code virtualization server 114 also deploys AGCP 126 on controller devices, e.g. edge devices 102, 103 or the gateway 108, based on an authorization or instruction received from the GUI 146. The authorization includes verification of login credentials supplied via the GUI 146 to validate deployment of the AGCP on the controller devices using know techniques. In some embodiments, libraries include a list of solutions, required hardware, processes, conventional systems, and a list of pre-defined operations or functionalities. In some embodiments (not shown), there may be multiple code virtualization servers, for example, each server associated with a different set of devices, or each server assigned to execute a different set of function calls, among other organization schemes.

The remote service 118 includes private or public services provided by third party servers or databases. For example, the remote service 118 includes third party databases and services (e.g., AMAZON, EBAY, FACEBOOK, APPLE PUSH NOTIFICATION servers, text message servers, email servers, and the like), or an internal data source (e.g., DB, noSQL DB, files and the like). The remote service 118 is accessible to the code virtualization server 114 via the network 110 or another network. In some embodiments, the remote service 118 may be accessed directly by the AGCPs being executed on the controller devices (102, 103, 108).

The network 110 comprises the Internet, or a wide area network (WAN) or a combination, and may include one or more such networks. The controller edge devices 103, the gateway 108, the user device 112, the CVS 114, and the remote service(s) 118 of the system 100 are communicably coupled via the network 110. The edge devices 103 are communicably coupled to each other, while the edge devices 102 are coupled to the each other and the gateway 108, for example, as illustrated in FIG. 1, using known techniques.

Figure 2:
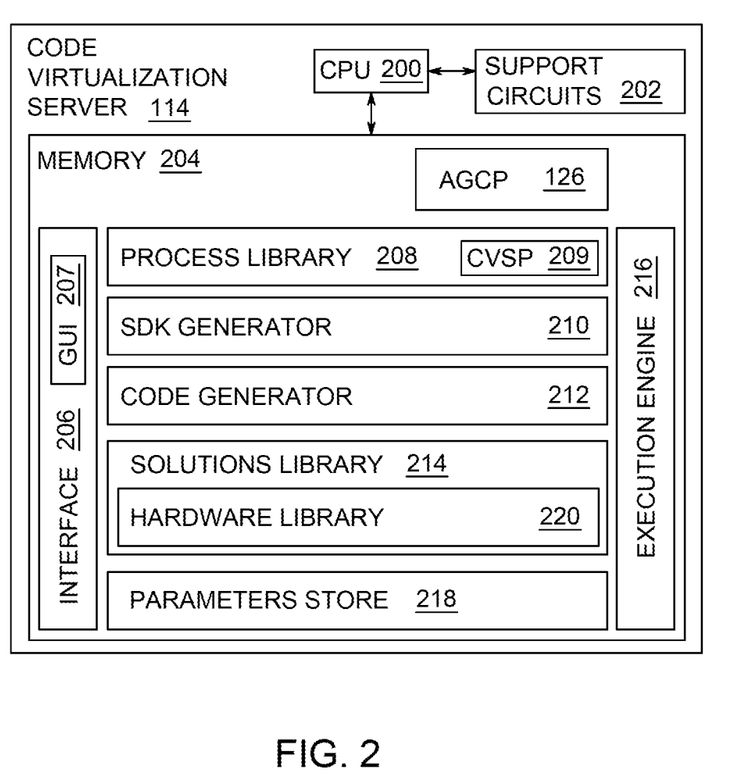
FIG. 2 is a block diagram of a code virtualization server of FIG. 1, in accordance with an embodiment of the invention.

FIG. 2 depicts a block diagram of the code virtualization server (CVS) 114 in accordance with an embodiment of the invention. The code virtualization server 114 may be a general-purpose computer or other electronic processing device that is programmed to be a specific purpose computer to perform functions related to embodiments of the present invention. The code virtualization server 114 comprises a CPU 200, support circuits 202, and memory 204 containing instructions and algorithms. The CPU 200 processes inputs and outputs to/from the devices. The CPU 200 may be any commercially available processor, microprocessor, microcontroller, and the like. The support circuits 202 comprise well known circuits that provide functionality to the CPU such as a user interface, clock circuits, network communications, cache, power supplies, I/O circuits, and the like. Alternative embodiments may use control algorithms on a custom Application Specific Integrated Circuit (ASIC). In some embodiments, the user interface comprises a keypad, electronic buttons, speaker, touchscreen, display, or other user interaction mechanism. The memory 204 may be any form of digital storage used for storing data and executable software. Such memory includes, but is not limited to, random access memory, read only memory, disk storage, optical storage, and the like.

The memory 204 stores computer readable instructions corresponding to an operating system (not shown), an interface 206, a process library 208, a SDK generator 210, a code generator 212, a solutions library 214, an execution engine 216, and a parameter store 218. In some embodiments, the interface 206 produces a portal containing a GUIs 207, which are sent to the user computer 112 for presentation to a user, for example as GUI(s) 146. The user, using one or more GUIs presented on the user computer 112 provides inputs regarding one or more of the desired solution, which is received as input by the code generator 212 and the SDK generator 210 to generate automatically, a program (e.g. AGCP) for execution on the controller devices, in a language native to the respective controller devices.

The process library 208 comprises programs or code corresponding to functions for execution upon receiving a remote call from a controller executing the AGCPs. Such programs are referred to as code virtualization server programs (CVSPs) 209. Each function or program is also referred to as a "choreograph" or a "choreo." The CVSP 209, when called by a controller device, causes execution of the CVSP 209 via the execution engine 216 at the code virtualization server 114. For example, the CVSP 209 performs certain functions that the controller devices would otherwise not be able to perform. The CVSP 209 may further include code for executing or provisioning one or more of the remote service(s) 118 (for example, AMAZON, FACEBOOK, TWITTER, among others) on a device remote to the code virtualization server 114, the user device 112 and the controller devices 102, 103 or 108.

The process library 208 also includes all processes applicable to the conventional system. For example, the process library 208 includes a process (program or code) for changing the state of the actuator based on a monitored state (i.e. a condition) of the conventional system. For example, in the water tank solution example, the process library 208 would include a process to turn off the supply from the grid, and this process would be triggered if the water level in the water tank is above a predefined level.

The SDK generator 210 generates an SDK for supporting the execution of the AGCPs on the controller devices. The SDK may be deployed along with the AGCP to the controller devices, and is included in the components 128 of the edge devices 102, 103 or the gateway 108.

The code generator 212 creates a complete program code, or snippets of code for insertion in a complete program code, for execution on the controller devices. The complete program code or the code snippets are generated in response to the input of the solutions defined by the user. Such code is referred to as automatically generated controller program (AGCP) 126, which may be stored in the memory 204. The AGCP 126 includes a call to the CVSP 209 on the code virtualization server 114, if defined by the user in the solution using the GUI. According to some embodiments, the AGCP 126 is sent directly to the controller devices for execution thereon, based on the user input received from the GUI 146. According to some embodiments, the AGCP is downloaded to the user device 112, based on the user input received from the GUI 146, and the user may then deploy the AGCP from the user device 112 to the controller devices.

The solutions library 214 includes pre-defined information about controller-based solutions for conventional systems. The solutions library 214 includes details of the conventional systems or components thereof (e.g. systems 131, 132 of FIG. 1) such as a water tank system, a refrigerator, a boiler system, a residential heating system, among several others. The details of conventional systems includes the various electronic devices, including sensors, actuators, or the like that can be used to monitor and manage the conventional system. The solutions library 214 also comprises a hardware library 220, which comprises a list of controller devices available to interface with such electronic devices of the conventional systems.

The solutions library 214 further includes language prompts and several other linguistic constructs, or questions, that incorporate the available solutions, sub-components of such solutions, hardware of the hardware library 220 to interact with a user. For example, the various language constructs or questions incorporating the solutions, sub-components therein, or the hardware may be used to prompt the user for appropriate inputs via the GUI, such as that with respect to selecting the appropriate remote solution, designing the solution by selecting individual components, or selecting and/or identifying hardware from the available list. Either the questions or language constructs for seeking input can be stored in one or more languages in the solutions library 214, or the solutions library 214 may incorporate a dynamic linguistic engine, such as those known in the art, to generate questions or language constructs in real time, or a combination thereof is employed. The libraries present several, easy to comprehend language or questions to users to elicit inputs that are easy for the users to provide, thereby reducing or eliminating the complexity of code and technical jargon. Such questions or language constructs are rendered via a GUI, for example, the GUI 146 on the user device 112.

According to some embodiments, the GUI 146 is a standalone GUI without a reference to the libraries on the CVS 114, and includes a set of pre-defined solution templates, or provides a blank template for the user to define the solution. Various formats for the GUI 146 will occur to those of ordinary skill, and all such formats are contemplated herein.

In the water tank solution example, the solutions library 214 contains the descriptor "water tank" and other synonyms to easily identify the available solution to the user, components of the water tank system, such as a water tank, one or more supply grids, a pump, associated pipes, a list of suitable controller devices, and electronic devices such as actuators for the pump, water level sensors, and the like. The hardware library 220 includes a list of controller devices compatible with the electronic devices, such as actuators and water level sensors, and all parameters pertaining to the controller device and the electronic devices. For example, the parameters may include the states of the actuator (pump "OFF", operational at "LOW SPEED", operational at "HIGH SPEED", the parameter monitored (for example, water level), states of the water level (for example, in inches, or "HIGH", "MEDIUM", "LOW"). In some embodiments, the controller devices and the electronic devices may be manufactured as a single composite device, and the hardware library 220 includes a list of such composite devices.

The process library 208, the solutions library 214 and the hardware library 220, together also referred to as "reference libraries," form an exhaustive pool of the available solutions for conventional systems, components of such conventional systems, controller devices, and electronic devices required to interface with such conventional systems, various processes required to operate the controller devices, and the parameters thereof. Each of the process library 208, the solutions library 214 and the hardware library 220 may be updated to add, remove or edit the available solutions. Such updates can be used to enhance the functionalities available to the controller device based remote solutions, without requiring an upgrade to the controller devices themselves.

Parameter store 218 comprises parameter data relating to the solution, and include, for example parameters to execute one or more programs (AGCPs, CVSPs), for provisioning the remote services, and for controlling the behavior of such programs or services. Such parameters include authentication details for accessing the AGCPs, CVSPs, controller devices, remote services, or data (e.g. a message) to be exchanged therewith. The parameter store 218 also comprises parameters relating to connectivity between various controller devices, sensors and actuators including connection type, network authentication details, at the like. In some embodiments, the parameters store 218 includes parameters relating to operational of the conventional system, such as a condition of the conventional system at the sensors (e.g. a particular measured value reaching a predefined threshold) or actuators (e.g. upon completion of an action by the actuator). The parameter store 218 also includes parameters related to the controller devices, for example, controller mode (edge or gateway), hardware type, processor type, pin configurations and connectivity to the sensors or actuators.

In some embodiments, the parameters store 218 comprises the specific values of the parameters of the solution. According to several embodiments, the behavior of the solution may be modified by modifying the parameter values, for example a second GUI similar or different from the GUI 146, and on remote GUI devices (not shown) other than the user device 112. In such embodiments, the remote GUI devices are communicably coupled to the network 110, and display in the second GUI thereon, parameter values, which may be modified by users. The second GUI may also display solution data, for example, sensor and actuator data, and the users may modify the parameter values, for example, limits set on a condition, using the second GUI. The change in the limits set on the condition changes when a corresponding action is initiated by the solution, without changing the programming (AGCP, CVSP) of the solution. Similarly, the users using the second GUI may modify parameter values related to an actuator, for example, changing the output of the actuator. The change in the output of the actuator changes the action that is initiated when a corresponding condition is met, without changing the programming (AGCP, CVSP) of the solution.

According to some embodiments, the parameters for which values can be changed, or parameter values that need monitoring via the second GUI, may be specified while building the solution, or at a later time. In some embodiments, a second server (not shown) connected to the network 110, is used for sending the monitored parameter data (e.g. sensor data, actuator data) from the controller devices to the second GUI, and for receiving a modification of the parameter values associated with the monitored parameter data. In such embodiments, the parameter values (as deployed, or updated using the second GUI) are stored on the second server in a manner similar to the parameters store 218 of the CVS 114, and monitored parameter data is monitored by the second server at predefined time intervals, continuously, that is in a streaming mode, or based on an event, such as a condition of the application system being met. The second server further communicates this data (monitored parameter data) to the second GUI at fixed intervals, continuously or in streaming mode, or or based on an event, such as a condition of the application system being met. In such embodiments, the AGCP and/or the CVSP are executed using the parameter values stored on the second server. In some embodiments, the second GUI is generated by the second server and rendered to the remote GUI devices. In some embodiments, the second server is implemented as a part of the CVS 114, and in some embodiments, the second server is implemented as a remote service 118.

Examples of parameters included in the profile 218 are illustrated, without limitation, in Table 1.

TABLE 1

| Type | Parameter | Example/Comments |
| --- | --- | --- |
| General | Profile name | Name of a set of parameters (includes all sub-profiles) |
| Hardware Profile | Hardware type | Arduino Uno, Arduino Yun, Texas Instruments CC3200, Raspberry PI, etc. |
| Hardware Profile | Processor type | AVR, ARM, PIC, etc. |
| Hardware Profile | Network Hardware | Arduino Wifi Shield, Built-in Ethernet, Ethernet Shield, BLE Shield, Built-in BLE |
| Credential Profile | Username | Username for a webservice like Facebook, . . . |
| Credential Profile | Password | Password for a webservice like Facebook, . . . |
| Credential Profile | API Key | Developer API key given by webservices like Facebook, . . . There can be several API keys |
| Credential Profile | API Secret | Developer API secret given by webservices like Facebook, . . . There can be several API secrets |
| Connection Profile | Connection Profile name | Allows to select different Connection profiles |

TABLE 1-continued

| Type | Parameter | Example/Comments |
|---|---|---|
| Connection Profile | Type | Wifi, Bluetooth, Zigbee, Z-WAVE, THREAD, LORA, 6LOWPAN, . . . |
| Connection Profile | Security Type | WPA, WEP, unsecured, . . . |
| Connection Profile | SSID | Wifi network identifier |
| Connection Profile | Password | Network password |
| Connection Profile | Transport Protocol | MQTT, CoAP, HTTP/S, TCP/IP . . . |
| Connection Profile | Role | Gateway or Edge |
| Setup Profile | Output Pin | Indicates which Output Pin is selected on the processor (multiple Output Pins can be selected) |
| Setup Profile | Input Pin | Indicates which Input Pin is selected on the processor (multiple Input Pins can be selected) |
| Setup Profile | Pin Rule | Specifies what rule is applied to a given Pin (Input or Output). For example: If Temperature = 19 then write High to Pin 12 |
| Input Profile | Required Input Parameter | Also called variable. Can be any parameter a choreo needs to be executed. Can be mutiple Input Parameters. For example, a choreo sending an email will need Input Parameters like: Email address, Subject, Body, Attachment, . . . |
| Input Profile | Optional Input Parameter | Optional Input parameters are used to add Parameters that are not necessary. Multiple Optional Input Parameters are possible. For example, a choreo sending an email has optional Input Parameters like: CC, BCC or encryption type |

The parameter store 218 includes parameters according to the desired behavior of the AGCP 126, and in turn the called CVSP 209 and/or the remote service 118. According to some embodiments of the present invention, the parameter store 218 includes parameters input by a user on the GUI 146 of the user device 112, and sent to the parameter store 218. According to some embodiments, certain parameters may be modified to control the behavior of the AGCP code without modifying the AGCP code itself. For example, modification of parameters relating to authentication details of a remote service would not require a modification or regeneration of the AGCP code. In some embodiments, the AGCP code may need to be modified or regenerated upon modification of the parameters, for example, parameters related to the controller configuration.

The execution engine 216 supports all the foregoing functions, for example, by executing CVSPs (choreos) called by controller devices 112, and further executing a remote service 118 on a device remote to the user device 112, the code virtualization server 114 and the controller devices 102, 103 or 108, and facilitating interoperability between the various components of the system 100. The execution engine 216 utilizes each of the functional blocks described above to enable a user to program controller devices, via the GUI 146 on the user device 112, and offering extended functionality to the controller devices through the code virtualization server 114 and the remote service 118.

In some embodiments, after executing the CVSP, the CVS 114 returns data resulting from executing the calls back to the controller device for further processing. The resultant data is sent in a format native to the controller device type, enabling the controller device to process such data further, for example, by continuing execution of the AGCP stored on the controller device. The CVS 114 either generates the resultant data in the native format of the controller device type, or converts the resultant data to the native format of the controller device type, using known techniques. In other embodiments, resultant data is not required by the controller device to continue its operation, and in such embodiments, the code virtualization server simply sends an indication or a confirmation that execution of the CVSP code (or abstracted code), executed in response to a call from the AGCP, is completed.

For simplicity of discussion, embodiments described herein show that the code virtualization server 114 generates the GUIs for monitoring and controlling the solution. In some embodiments, as discussed above, the GUIs for monitoring and controlling the solutions are implemented on an independent server, which is different from and remote to, the code virtualization server. As also discussed above, any one or more of the several functionalities of the code virtualization server 114 described herein can be implemented via two or more servers independent of the code virtualization server as will occur readily to those of ordinary skill, and all such implementations are contemplated herein.

Figure 3:
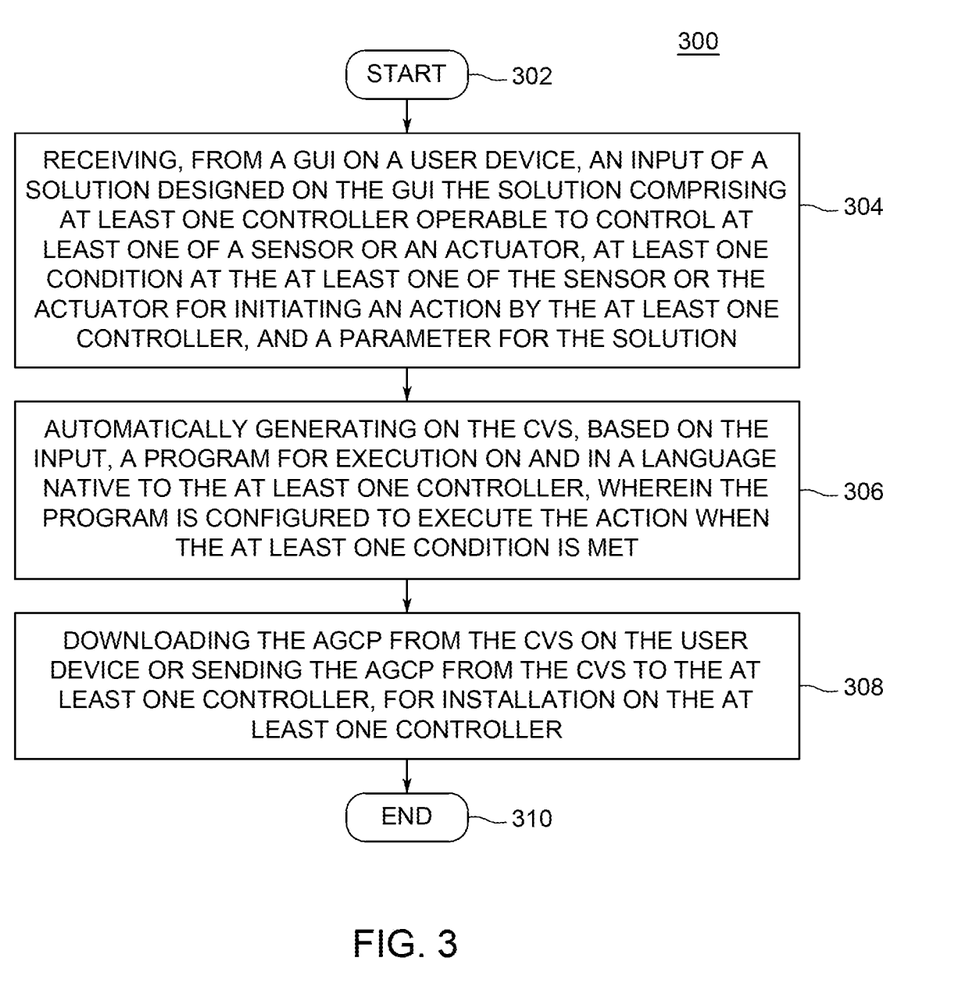
FIG. 3 is a flow diagram of a method for creating and managing remote solutions as executed by the code virtualization server of FIG. 1, in accordance with an embodiment of the invention.

FIG. 3 depicts a flow diagram of a method 300 executed by the code virtualization server (CVS) 114 for creating controller based remote solution, in accordance with embodiments of the present invention. In some embodiments, the method 300 is executed in response to manipulation of a GUI, for example, the GUI 146 of the user device 112, interacting with the interface 206 of the code virtualization server 114. In some embodiments, the GUI 146 is the GUI 207 implemented via a network browser, such as INTERNET EXPLORER, GOOGLE CHROME, MOZILLA FIREFOX, for example, on the user device. In some embodiments, the GUI 146 is a standalone GUI on the user device 112.

The method 300 begins at step 302 and proceeds to step 304, at which the method 300 receives, at the CVS 114, an input of a solution designed on the GUI 146. The solution includes one or more controllers, for example, the controllers 102, 103 or 108 of FIG. 1, communicably coupled with and operable to control one or more sensors and/or actuators deployed in an application system (e.g. water tank, boilers, refrigeration systems). The sensors and/or actuators may also be referred to as electronic devices, for example, the electronic devices 122. The controllers 103 and 108 are communicably coupled to the CVS 114 directly, while the controllers 102 are communicably coupled to the CVS 114 via the controller 108. All the controllers (102, 103, 108) are remote to the CVS 114 and the user device 112. The solution further includes specification of a condition of the application system, for example, at the sensors and/or the actuators. The condition may include a state of a sensor (a particular threshold value of a quantity being measured), or a state of an actuator (completion of an action), based on which the solution may be designed to take further action. The solution includes definition of an action to be executed by the controller when the specified condition is met. The solution also includes one or more parameters for the solution, for example, various parameters as discussed above. The solution is stored on the CVS 114, and further operationalized as follows.

The method 300 proceeds to step 306, at which the method 300 automatically generates, on the CVS 114, a program for execution on the controllers (102, 103, 108). The automatically generated controller program (AGCP) 126 comprises code for checking if the condition specified in the solution is met, and code for executing the action specified in the solution. The AGCP is generated in a language native to the controller for which the AGCP is being generated. The AGCP may also include an SDK or other code components for assisting in the execution of the AGCP. In some embodiments, the SDK or code components may be generated separately, and may not be included in the AGCP. The AGCP includes code to manage the inputs and outputs of the controllers, and assignment of such inputs and outputs to the sensors or actuators to appropriately send and receive data with the actuators and sensors. For example, the AGCP includes code for registering specific input and out ports (e.g. pins) of the controllers for monitoring the condition at the sensors or the actuators, for instructing the actuators, for communicating with other controllers (e.g. a gateway), the CVS 114, or directly with the remote service 118, according to the solution defined by the user on the GUI 146.

The method 300 proceeds to step 308, at which the method 300 downloads the AGCP to storage (e.g. memory 144) on the user device 112, for example, for installation of the AGCP on the controller devices by the user using the GUI 146. Alternatively, at step 308, the method 300 sends the AGCP directly to the controller devices for installation, based on an input received from the GUI 146. The method 300 proceeds to step 310, at which the method 300 ends.

The AGCP installed on the controller devices according to the method 300, upon being executed by the controller devices, function to check fro the specified condition of the solution being met, and upon the condition being met, execute the action specified in the solution. Such actions may include directing the actuator to take additional actions, sending status information to the CVS 114 or another designated device, placing a remote call to execute a program remote to the controller devices, among several other programmable actions.

Figure 4:
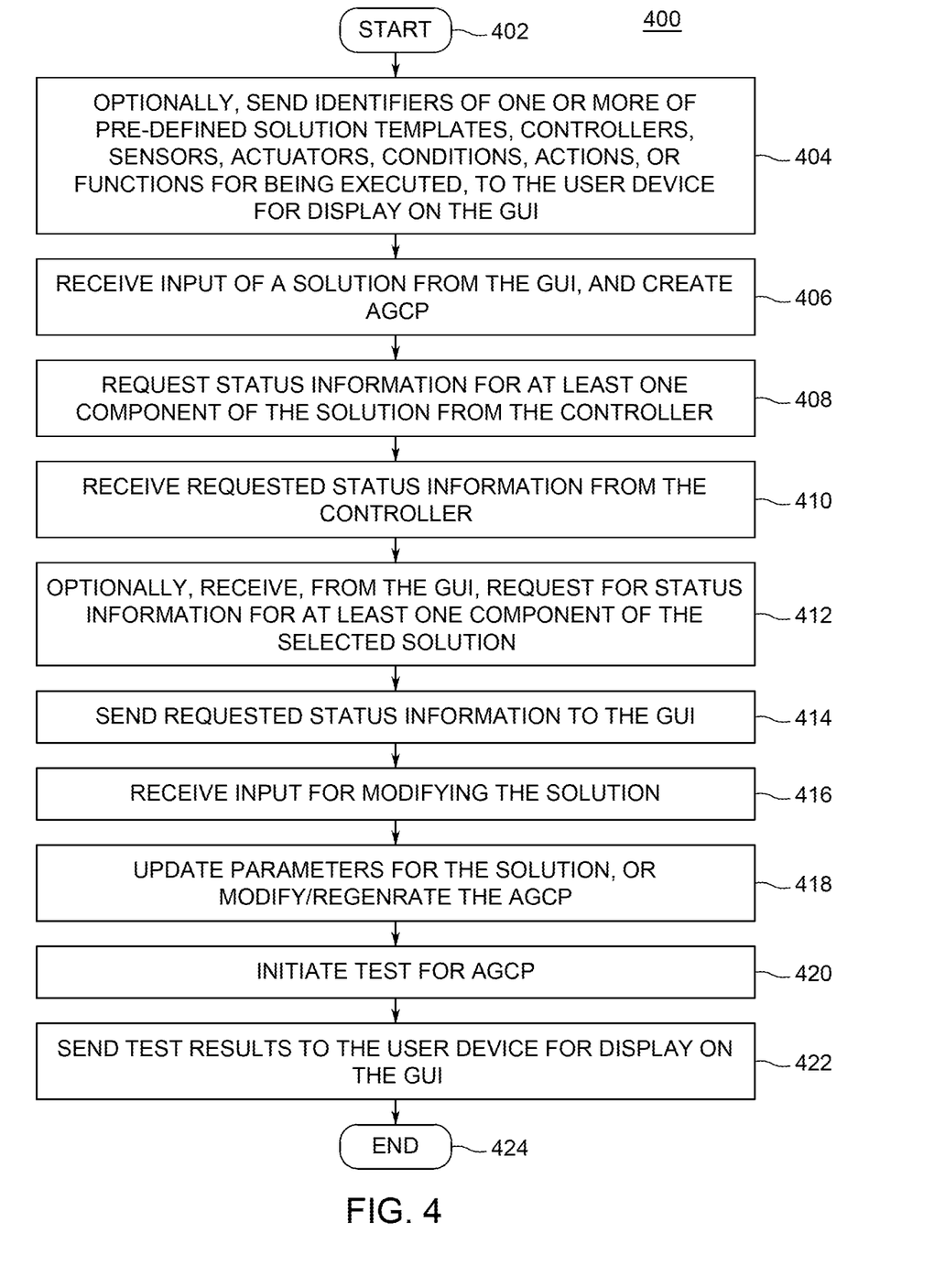
FIG. 4 is a flow diagram of a method for managing the remote solution as executed by the code virtualization server of FIG. 1, in accordance with an embodiment of the invention.

FIG. 4 depicts a flow diagram of a method 400 executed by the code virtualization server (CVS) 114 for managing controller based remote solution, in accordance with embodiments of the present invention. Similar to the method 300, the method 400 is executed in response to manipulation of the GUI 146. At any time, only one or some of the steps of the method 400 may be implemented, as needed. To manage (monitor and modify) the solution, implementation of all the steps of the method 400 is not necessary.

The method 400 begins at step 402, and proceeds to optional step 404, at which the method 400 sends identifiers of one or more of pre-defined solution templates, controllers, sensors, actuators, conditions, actions, or functions for being executed on the CVS 114 based on a remote call from the controller devices, to the user device 112, for display using the GUI 146. The method 400 proceeds to step 406, at which the method 400 receives input of a solution designed on the GUI 146, and creates AGCPs for the various controllers of the solution, for example, according to the method 300 of FIG. 3, thereby creating a controller based remote solution for the application system.

The method 400 proceeds to step 408, at which the method 400 requests from the controllers, status information for one or more components of the solution, for example, the controllers, the sensors, the actuators, the condition, the action, or the parameters, and at step 410, the method 400 receives the requested status information. According to some embodiments, the controllers automatically send status information to the method 400, without requiring a request from the method, for example, as made in the step 408. For example, the controllers may send the status information automatically upon occurrence of a predefined event, including the condition being met, at predefined intervals, or may stream status information continuously.

The method 400 proceeds to optional step 412, at which the method 400 receives a request, for example, from the GUI 146, for status information of one or more components of the solution, for example, the controllers, sensors, actuators, the condition, the action or the parameters. The method 400 proceeds to step 414, at which the method 400 sends status information to the user device 112 for display on the GUI 146. The method 400 may send the status information automatically, for example, upon occurrence of a predefined event, including the condition being met, at predefined intervals, or may stream status information continuously to the user device. According to some embodiments, the status information is sent at step 414 in response to the request received at optional step 412.

The method 400 proceeds to step 416, at which the method 400 receives an input for modification of one or more components of the solution from the GUI 146. The method 400 proceeds to step 418, at which the method 400 either automatically updates parameters in the parameter store 218 based on the received modification, or the method 400 modifies or regenerates the AGCP 126 based on the received modification, and sends the modified or regenerated AGCP 126 to the corresponding controllers for which modification is received. AGCP is modified or regenerated when the solution modification relates the controller or a configuration thereof, for example, change of a controller type or processor type, change of pins associated with the sensors or actuators. When a parameter, which does not relate to a change of a configuration in the controllers, the sensors, or the actuators, is modified, modification or regeneration of the AGCP is usually not required. In such instances, the parameters are updated on the parameter store 218, and consequently, updated parameters are accessible to the AGCP.

The method 400 proceeds to step 420, at which the method initiates a test for execution of the AGCP on the controllers, using known techniques. The test may be conducted on physical controllers, for example after deploying the AGCPs from the CVS 114, or on emulated controllers, for example using the GUI 146 and AGCPs downloaded on the user device 112. At step 422, the method 400 sends the results of testing to the user device 112, for display on the GUI 146. The method 400 proceeds to step 424, at which the method 400 ends.

Figure 5:
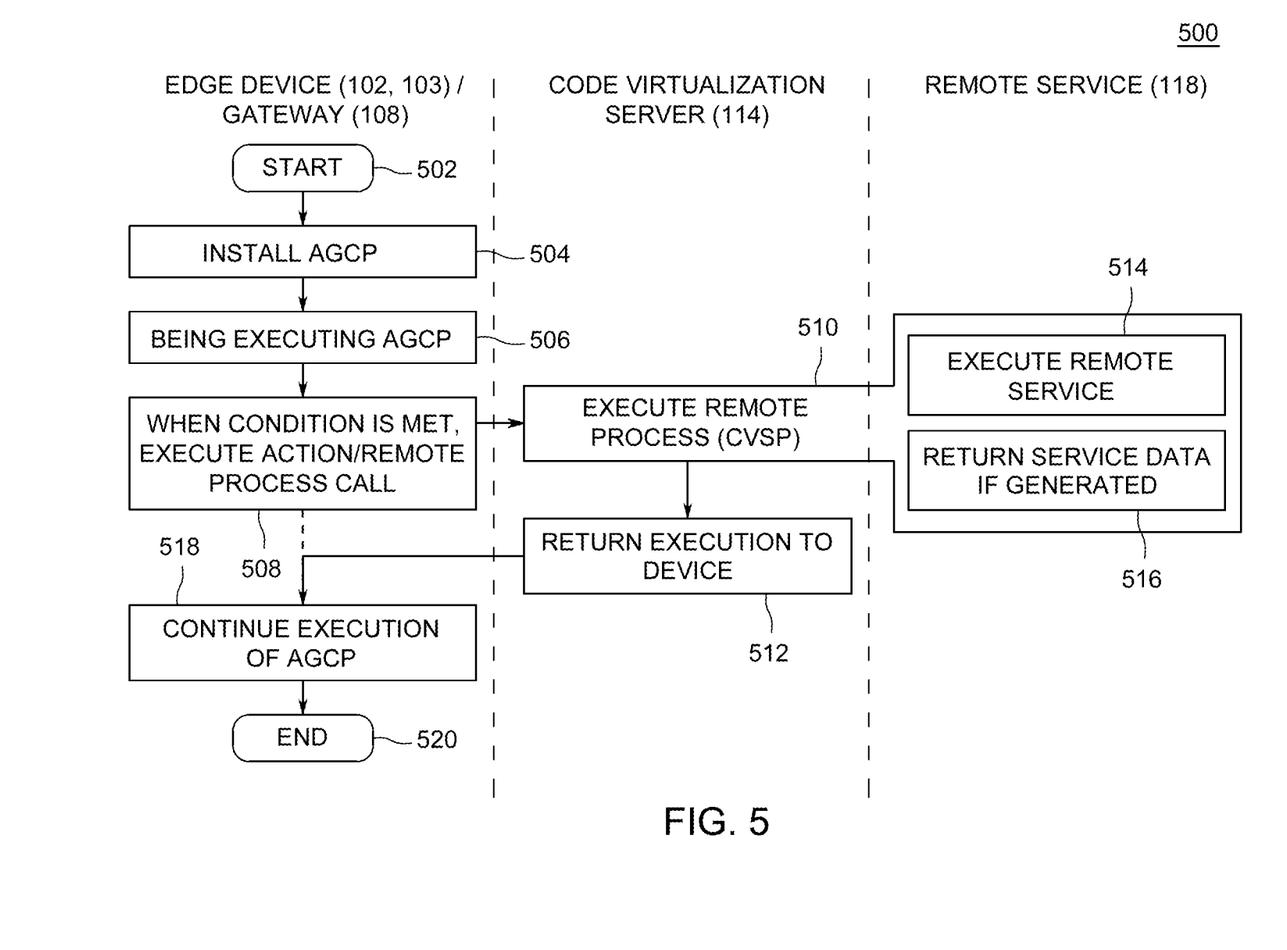
FIG. 5 is a flow diagram illustrating a method for operation of a remote solution on a controller device, the code virtualization server, and a remote service, in accordance with an embodiment of the invention.

FIG. 5 is a flow diagram illustrating a method 500 for operation of a remote solution on a controller device (devices 102, 103 or the gateway 108), the code virtualization server 114, and a remote service 118, in accordance with an embodiment of the invention. The method 500 starts at step 502 on the controller device, and proceeds to step 504 at which the method 500 installs the AGCP 126 on the controller device. The AGCP 126 includes predefined program code or process associated with the controller device, and a corresponding SDK. The AGCP 126 includes a call to a remote device for executing a program corresponding to a functionality. For example, the call may be directed to the CVSP 209 on the code virtualization server 114. At step 506, the method 500 begins executing the AGCP 126 on and by the controller device. The installation and/or execution of the AGCP 126 may be initiated by the code virtualization server 114, or by the GUI 146 on the user device 112. During the course of execution, the AGCP monitors for a condition at the coupled sensors or actuators being met, for example, as specified in the solution based on which the AGCP is generated, according to the method 300 of FIG. 3. At step 508, when the condition is met, the AGCP executes the action specified in the solution. According to some embodiments, the action includes operating the actuator, sending sensor or actuator data for display to the GUI, or placing a remote call to a process for being executed on a remote device, for example, the CVS 114. Operating the actuator is accomplished in normal course of execution of the AGCP on the controller, and in such cases, the action is to continue execution of the method 500 on the controller. In such cases, a remote call is not placed, and the execution of the method 500 does not need to shift out of the controller, the method 500 proceeds directly to step 518.

Placing a remote call, or sending sensor or actuator data to the GUI (which may be a remote call placed for sending the sensor or actuator data to the GUI), requires shifting the execution of the method 500 from the controller to the CVS 114, and in such cases, the action is placing a remote call to the CVS 114. The CVS 114 comprises a program (CVSP) corresponding to the remote call, and upon receiving the remote call, the method 500 proceeds to step 510 at the CVS 114, at which the method 500 executes the CVSP For example, the method 500 executes the CVSP 209 from the process library 208 using the execution engine 216. For example, at step 510, the method 500 may send the sensor and/or actuator data from the controller to the user device for display on the GUI 146. According to some embodiments, upon completion of the execution of the CVSP 209, and therefore of the remote call 129, the method 500 proceeds to step 512.

In some embodiments, the AGCP 126 and the remote call 129 is additionally configured to execute the remote service 118, and in such embodiments, the step 510 further comprises optional steps 514 and 516. At steps 514 and 516, execution of the method 500 shifts to the remote service 118, executed by a device remote to the controller devices, the code virtualization server and the user device. The method 500 executes the remote service 118 at step 514, and proceeds to step 516, at which the method 500 returns service data, if generated by the execution of the remote service 118, to the step 510. The execution of the CVSP 209, which includes the execution of the remote service 118 is completed at step 510. The method 500 proceeds to step 512, at which the execution of the method 500 is returned from the code virtualization server 114 to the controller device. According to some embodiments, any data that is returned to the controller device along with the execution of the method 500, is converted to a format native to or compatible with the language of the controller device. At step 518, the method 500 continues the execution of the AGCP 126 on the controller device. In some embodiments, the code execution may complete at the step 510 on the code virtualization server 114, and no additional execution of code may take place at steps 512 and 518. The method 500 proceeds to step 420, at which the method 500 ends.

Figure 6:
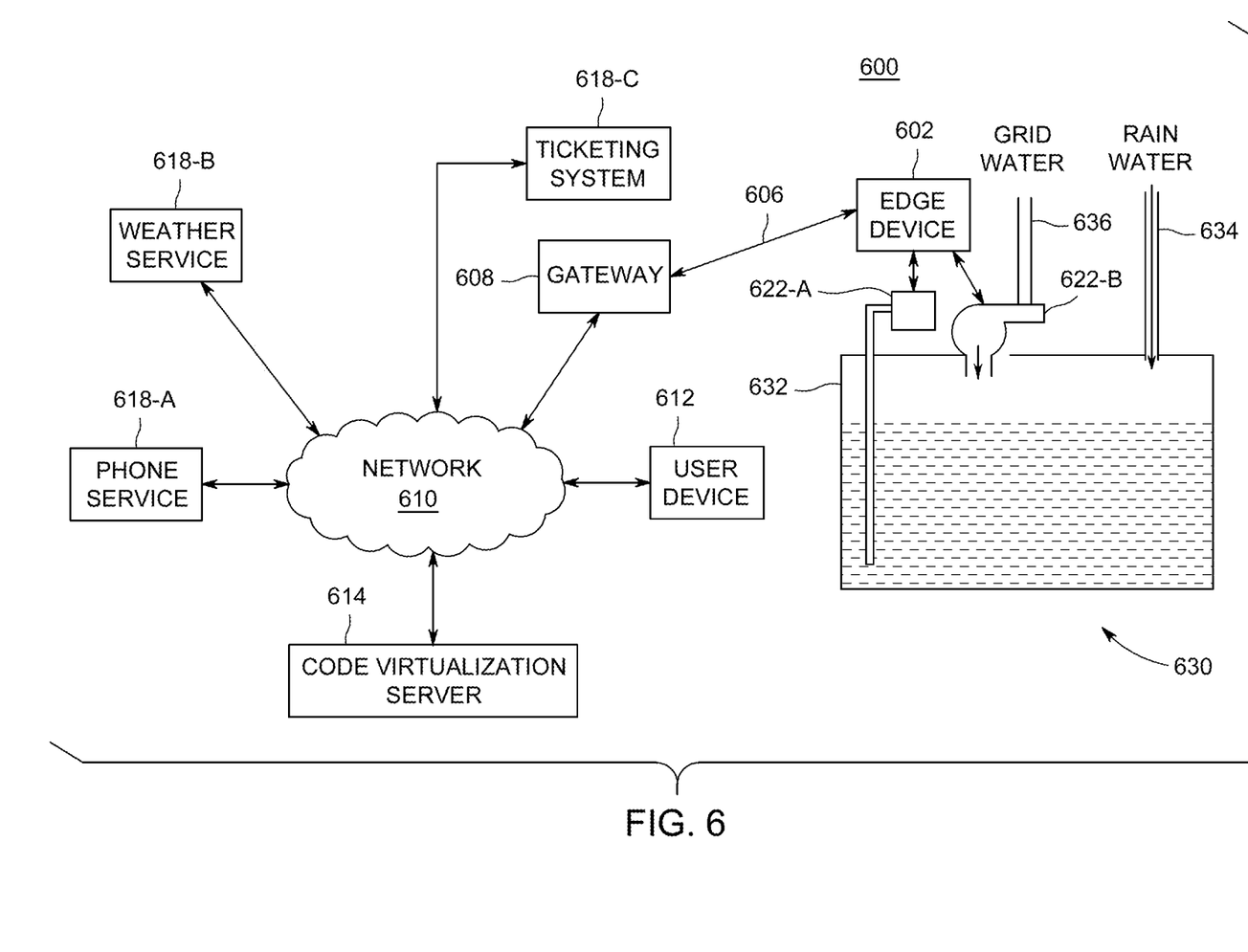
FIG. 6 depicts a remote solution created and managed, in accordance with an embodiment of the invention.

FIG. 6 depicts a remote solution 600 created in accordance with an embodiment of the invention. The conventional system 630 comprises a tank 632, a pump 622-B coupled to a water grid 636, a rainwater harvesting supply 634, and a water level sensor 622-A. According to embodiments of the invention, the solution 600 comprises an edge device 602, a gateway device 608, a network 610, a user device 612, a code virtualization server 614, and remote services 618-A, 618-B and 618-C, similar to the edge device 102, the gateway device 108, the user device 112, the code virtualization server 114, and the remote service(s) 118 of FIG. 1, respectively. The edge device 602 is communicably coupled, for example, via a wireless means 606 to the gateway device 608, for managing the conventional system 630 according to the solution configured by the user via a GUI (not shown) on the user device 612, and implemented by the code virtualization server 614. Further, the communication connections between the edge device 602 and the components of the conventional system, for example, the sensor 622-A or the pump 622-B, may be wired or wireless.

Each of the gateway device 608 and the edge device 602 is a controller device configured with a respective AGCP according to the method 300. The AGCP comprises a call to a device (e.g. the code virtualization server 614) remote to the edge device 602 and the gateway device 608. The gateway device 608 is configured to route the calls from the edge device 602 appropriately via the network 610. The calls are typically made to the code virtualization server 614 comprising a process having the desired functionality according to the call in the AGCP. In some embodiments, the code virtualization server 614, and the remote services 618-A, 618-B, 618-C are communicably coupled to the gateway 608 via the network 610. In some embodiments, the code virtualization server 614 comprises a process library comprising the CVSP and the execution engine. In some embodiments, the call from the edge device 602 is made via the gateway 608, to the CVSP (not shown) on the code virtualization server 614, which executes the CVSP, and in turn executes one or more of the remote service, for example, a phone call service 618-A, such as that provided by NEXMO INC., ora weather forecast service 618-B, such as that provided by YAHOO! INC., or a ticketing system service 618-C for raising a complaint ticket to a management company for the water tank system 630.

According to some embodiments, the phone call service 618-A is used to notify the user or a plumbing company in case of an issue detected in the water tank, or upon a particular condition set by the user being met. For example, the user may specify, via parameters entered using the GUI of the user device, that if the water level in the tank 632 measured by the sensor 622-A is low, the edge device 602 notifies the user by placing a call using the phone call service 618-A. Additionally, the edge device 602 is configured to actuate the pump 622-B to supply water from the grid 636 to the tank 632. As another example, the weather forecast service 618-B may be used by the solution 600 as implemented by the embodiments of the invention, to delay using the grid water supply 636 in case rain is anticipated. For example, the user may specify a condition in the AGCP or the CVSP, that if the weather prediction for the day is that it is likely to rain, and even if the water level in the tank 632 as measured by the sensor 622-A is low, to not supply water from the grid 636 to the tank 632. According to some embodiments, the edge device 602 notifies the user that the water level is low but the grid water is not being supplied due to anticipated rains. Several similar applications of such and other services will occur readily to those skilled in the art without departing from the scope and spirit of the embodiments described herein, and defined by the claims.

Embodiments of the invention provide a solution centric approach to design, create and deploy controller based remote solutions to operate and manage conventional systems. Embodiments of the invention also provide management of remote solutions thus created. Embodiments of the invention also provide enhancing the capacity of the remote solutions without requiring modification of the controller vices, for example, by effecting an update with the code virtualization server.

While the method 300 described herein utilizes the GUI 146 on the user computer 112 for accessing the code virtualization server 114 remotely to create and manage remote solutions, the remote solutions can be created and managed by accessing the code virtualization server 114 directly, for example using the interface 206 or the GUI 207. The GUI 146 may take various forms to provide tools for receiving inputs for designing, testing, monitoring, and modifying controller based solutions for application systems. The GUI 146 may include selectable text, form fields, icons representing elements or parameters of the solution, graphs and tables to display a state of the solution, among several other elements conventionally used in GUIs for the purpose of receiving inputs and presenting information or outputs. As would occur readily to those of ordinary skill, various such variations of the GUIs may be used in order to practice the embodiments described, without departing from the scope and spirit of the invention. While the embodiments are described with respect to Internet of things (IoT) devices, those skilled in the art will readily appreciate that the techniques exemplified by the disclosed embodiments are applicable to several other programming environments.

The methods described herein may be implemented in software, hardware, or a combination thereof, in different embodiments. The methods may be incorporated in processor executable instructions stored on non-transitory computer readable media. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for creating and managing a controller based remote solution, the method comprising:
   receiving, at a code virtualization server (CVS), from a graphical user interface (GUI) on a user device remote to the CVS, an input of a solution designed on the GUI, the solution comprising:
      at least one controller communicably coupled with and operable to control at least one of a sensor or an actuator, wherein the at least one controller is remote to the CVS and the user device,
      a condition at the at least one of the sensor or the actuator,
      an action for execution by the at least one controller, wherein the action is executed upon the condition being met,
      at least one parameter for the solution, and
      a function for being called by the at least one controller for being executed remotely to the at least one controller;
   automatically generating on the CVS, based on the input solution, a program for execution on the at least one controller, wherein the program comprises code to check if the condition is met, and to execute the action when the condition is met;
   embedding, in the automatically generated controller program (AGCP), a remote call from the at least one controller to the CVS for executing the function on the CVS;
   sending the AGCP from the CVS to a storage on the user device, or sending the AGCP from the CVS to the at least one controller, for installation on the at least one controller;
   receiving, at the CVS from the at least one controller, the remote call for executing the function; and
   executing the function on the CVS, wherein executing the function further comprises provisioning a remote service, wherein the remote service is other than a service provided by the at least one controller or the CVS.

2. The method of claim 1, wherein the solution is selected from a pre-defined solution template, or the solution is built by defining individually, one or more of the at least one controller, the at least one of the sensor or the actuator, the condition, the action, the at least one parameter, or connections therebetween.

3. The method of claim 2, further comprising sending identifiers of at least one of controllers, sensors, actuators, conditions, actions, or pre-defined solution templates stored in a solutions library on the CVS, from the CVS to the user device for display on the GUI.

4. The method of claim 1, further comprising:
   receiving a request for status information of at least one of the at least one controller, the at least one sensor or the actuator, the at least one condition, the action, or the parameter from the GUI; and
   sending the requested status information to the user device for display in the GUI.

5. The method of claim 4, further comprising:
   requesting, from the at least one controller, status information for at least one of the at least one controller, the at least one sensor or the actuator, the at least one condition, the action, or the parameter; and
   receiving the requested status information.

6. The method of claim 4, further comprising:
   receiving, at the CVS from the GUI, an input for modification of at least one of the at least one controller, the at least one sensor or the actuator, the at least one condition, the action, or the parameter, wherein the modification necessitates a change in the AGCP;
   automatically modifying or regenerating the AGCP based on the modified input; and
   sending the modified or regenerated AGCP to the at least one controller for installation on the controller.

7. The method of claim 4, further comprising:
   receiving, at the CVS from the GUI, an input for modification of the parameter, wherein the modification does not necessitate modification or regeneration of the AGCP; and
   automatically updating the at least one parameter based on the modification.

8. The method of claim 7, wherein the modification of the parameter does not relate to a change of a configuration in the at least one controller, or the at least one of the sensor or the actuator.

9. The method of claim 1, wherein the at least one parameter comprises at least one of:
profile name for identifying a profile,
hardware parameters including hardware type, processor type,
connection parameters including network hardware, username, password, API key and/or secret,
connection type, connection security type, connection ID and password for accessing the network, connection transport protocol, gateway or edge role for the at least one controller,
setup parameters including identification and assignment of output pin(s), input pin(s), rules for pins specifying data is generated by or interpreted at the pin, or
input parameters including required input(s) for operating a function, or optional input(s) that are not necessary for operating the function, wherein the function is executed remote to the controller.

10. The method of claim 1, wherein the AGCP is automatically generated in a language suitable for execution on the at least one controller.

11. The method of claim 1, wherein the at least one controller comprises at least one of an input or an output, and wherein the method further comprises receiving an assignment of the at least one condition to the at least one of the input or the output.

12. The method of claim 1, further comprising:
testing execution of the AGCP on the at least one controller; and
sending results of the testing to the user device for display on the GUI.

13. The method of claim 1, further comprising:
sending definition of at least one function stored in a process library on the CVS, to the user device for display on the GUI, the at least one function comprising the function comprised in the solution.

14. The method of claim 13, wherein the action comprises at least one of placing the remote call, sending sensor or actuator data for display to the GUI, or operating the actuator.

15. The method of claim 14, further comprising:
sending data from the execution of the function to the at least one controller.

16. An apparatus for creating and managing a controller based remote solution, the apparatus comprising:
a processor; and
a memory comprising executable instructions, which when executed using the processor, implement a method comprising:
receiving, at a code virtualization server (CVS), from a graphical user interface (GUI) on a user device remote to the CVS, an input of a solution designed on the GUI, the solution comprising:
at least one controller communicably coupled with and operable to control at least one of a sensor or an actuator, wherein the at least one controller is remote to the CVS and the user device,
a condition at the at least one of the sensor or the actuator,
an action for execution by the at least one controller, wherein the action is executed upon the condition being met,
at least one parameter for the solution,
a function for being called by the at least one controller for being executed remotely to the at least one controller;
automatically generating on the CVS, based on the input solution, a program for execution on the at least one controller, wherein the program comprises code to check if the condition is met, and to execute the action when the condition is met;
embedding, in the automatically generated controller program (AGCP), a remote call from the at least one controller to the CVS for executing the function on the CVS;
sending the AGCP from the CVS to a storage on the user device, or sending the AGCP from the CVS to the at least one controller, for installation on the at least one controller;
receiving, at the CVS from the at least one controller, the remote call for executing the function; and
executing the function on the CVS, wherein executing the function further comprises provisioning a remote service, wherein the remote service is other than a service provided by the at least one controller or the CVS.

17. The apparatus of claim 16, wherein the method further comprises:
receiving a request for status information of at least one of the at least one controller, the at least one sensor or the actuator, the at least one condition, the action, or the parameter from the GUI; and
sending the requested status information to the user device for display in the GUI.

18. The apparatus of claim 17, wherein the method further comprises:
receiving, at the CVS from the GUI, an input for modification of at least one of the at least one controller, the at least one sensor or the actuator, the at least one condition, the action, or the parameter; and
automatically implementing one of:
modifying or regenerating the AGCP based on the modified input if the modification necessitates a change in the AGCP, and sending the modified or regenerated AGCP to the at least one controller for installation on the controller, or
updating the at least one parameter based on the modification, if the modification does not necessitate a change in the AGCP.

19. The apparatus of claim 16, wherein the action comprises at least one of placing the remote call, the method further comprising
sending data from the execution of the function to the at least one controller.

* * * * *